(12) United States Patent
Yoshida et al.

(10) Patent No.: US 11,943,422 B2
(45) Date of Patent: Mar. 26, 2024

(54) THREE-DIMENSIONAL IMAGE-CAPTURING DEVICE AND IMAGE-CAPTURING CONDITION ADJUSTING METHOD

(71) Applicant: FANUC CORPORATION, Yamanashi (JP)

(72) Inventors: Junichirou Yoshida, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 147 days.

(21) Appl. No.: 17/790,970

(22) PCT Filed: Feb. 22, 2021

(86) PCT No.: PCT/JP2021/006580
§ 371 (c)(1),
(2) Date: Jul. 6, 2022

(87) PCT Pub. No.: WO2021/172256
PCT Pub. Date: Sep. 2, 2021

(65) Prior Publication Data
US 2023/0040615 A1 Feb. 9, 2023

(30) Foreign Application Priority Data
Feb. 27, 2020 (JP) .................. 2020-031614

(51) Int. Cl.
*H04N 13/239* (2018.01)
*B25J 13/08* (2006.01)
(Continued)

(52) U.S. Cl.
CPC ............ *H04N 13/239* (2018.05); *B25J 13/08* (2013.01); *G01B 11/25* (2013.01); *G01C 3/085* (2013.01);
(Continued)

(58) Field of Classification Search
CPC .... H04N 13/239; H04N 13/296; H04N 23/73; H04N 23/74; H04N 2013/0081;
(Continued)

(56) References Cited

U.S. PATENT DOCUMENTS 11,813,684 B2 * 11/2023 Yamaoka ................. B23H 7/06
2008/0240511 A1 10/2008 Ltd.
(Continued)

FOREIGN PATENT DOCUMENTS

EP 2045772 A2 4/2009
JP 2004245701 A 9/2004
(Continued)

OTHER PUBLICATIONS

International Search Report (with English Translation) and Written Opinion (with Machine Translation) dated Apr. 20, 2021, in connection with corresponding International Application No. PCT/JP2021/006580; 12 pages.

*Primary Examiner* — Richard T Torrente
(74) *Attorney, Agent, or Firm* — Maier & Maier, PLLC

(57) ABSTRACT

A 3D image-capturing device that includes at least one camera that acquires a 2D image and distance information of an object, a monitor that displays the 2D image acquired by the camera, and at least one processor including hardware. The processor acquires a first area for which the distance information is not required in the 2D image displayed on the monitor, and sets an image-capturing condition so that the amount of distance information acquired by the camera in the acquired first area is less than or equal to a prescribed first threshold and the amount of distance information acquired by the camera in a second area, which is at least part of an area other than the first area, is greater than a prescribed second threshold that is larger than the first threshold.

12 Claims, 5 Drawing Sheets

(51) Int. Cl.
 *G01B 11/25* (2006.01)
 *G01C 3/08* (2006.01)
 *H04N 13/296* (2018.01)
 *H04N 23/73* (2023.01)
 *H04N 23/74* (2023.01)
 *G06T 7/62* (2017.01)
 *H04N 13/00* (2018.01)

(52) U.S. Cl.
 CPC ........... *H04N 13/296* (2018.05); *H04N 23/73* (2023.01); *H04N 23/74* (2023.01); *G06T 7/62* (2017.01); *H04N 2013/0081* (2013.01)

(58) Field of Classification Search
 CPC ......... H04N 7/185; B25J 13/08; B25J 9/1697; G01B 11/25; G01B 11/2545; G01C 3/085; G05B 2219/39393
 See application file for complete search history.

(56) References Cited

U.S. PATENT DOCUMENTS

2018/0310829 A1* 11/2018 Frangioni .............. A61B 34/20
2019/0180505 A1*  6/2019 Zoken ................... G01B 11/24

FOREIGN PATENT DOCUMENTS

| JP | 2008246631 A | 10/2008 |
| JP | 2008298533 A | 12/2008 |
| JP | 2009210520 A |  9/2009 |
| JP |  201293118 A |  5/2012 |
| JP |  201928775 A |  2/2019 |

* cited by examiner

THREE-DIMENSIONAL IMAGE-CAPTURING DEVICE AND IMAGE-CAPTURING CONDITION ADJUSTING METHOD

TECHNICAL FIELD

The present disclosure relates to a 3D image-capturing device and an image-capturing condition adjusting method.

BACKGROUND

An object picking device that measures the distance to an object using a 3D image-capturing device and picks the object using a robot is known (for example, refer to Japanese Unexamined Patent Application Publication No. 2008-246631)

SUMMARY

An aspect of the present disclosure provides a 3D image-capturing device that includes at least one camera that acquires a 2D image and distance information of an object, a monitor that displays the 2D image acquired by the camera, and at least one processor including hardware. The processor acquires a first area for which the distance information is not required in the 2D image displayed on the monitor, and sets an image-capturing condition so that an amount of the distance information acquired by the camera in the acquired first area is less than or equal to a prescribed first threshold and an amount of the distance information acquired by the camera in a second area, which is at least part of an area other than the first area, is greater than a prescribed second threshold that is larger than the first threshold.

DETAILED DESCRIPTION OF EMBODIMENTS

Figure 1:
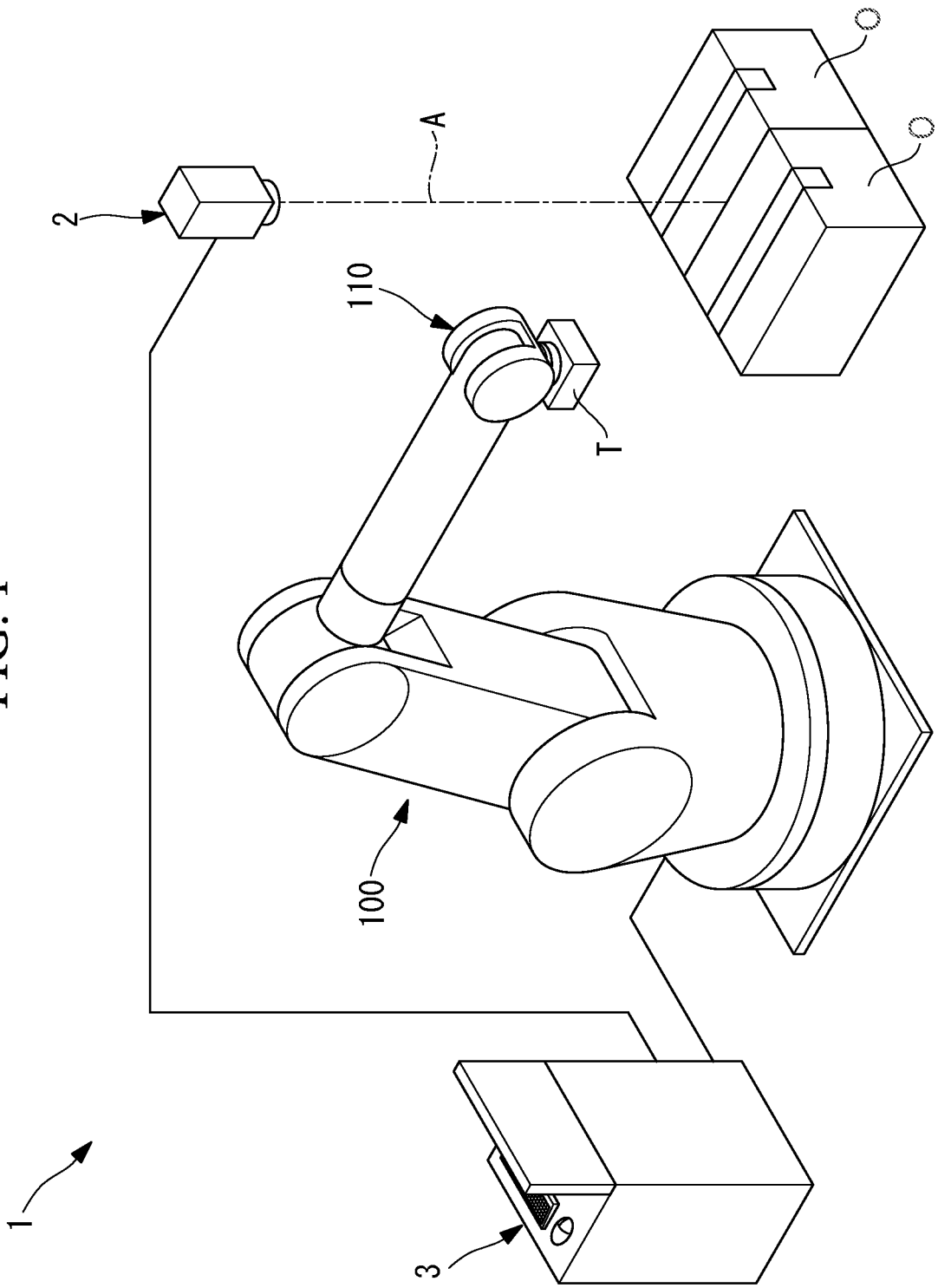
FIG. 1 is a perspective view illustrating an example of a robot system to which a 3D image-capturing device according to an embodiment of the present disclosure is applied.

A 3D image-capturing device 1 and an image-capturing condition adjusting method according to an embodiment of the present disclosure will be described below while referring to the drawings. As illustrated in FIG. 1, the 3D image-capturing device 1 according to this embodiment is, for example, a device that acquires distance information of an object O to be picked by a robot 100. The 3D imaging device 1 includes a 3D camera (camera) 2 that performs image capturing on the object O and acquires a 2D image and distance information, and a controller 3 to which the acquired 2D image and distance information are input. In FIG. 1, sign T indicates a hand that is attached to the tip of a wrist 110 of the robot 100 and can grip the object O.

Figure 2:
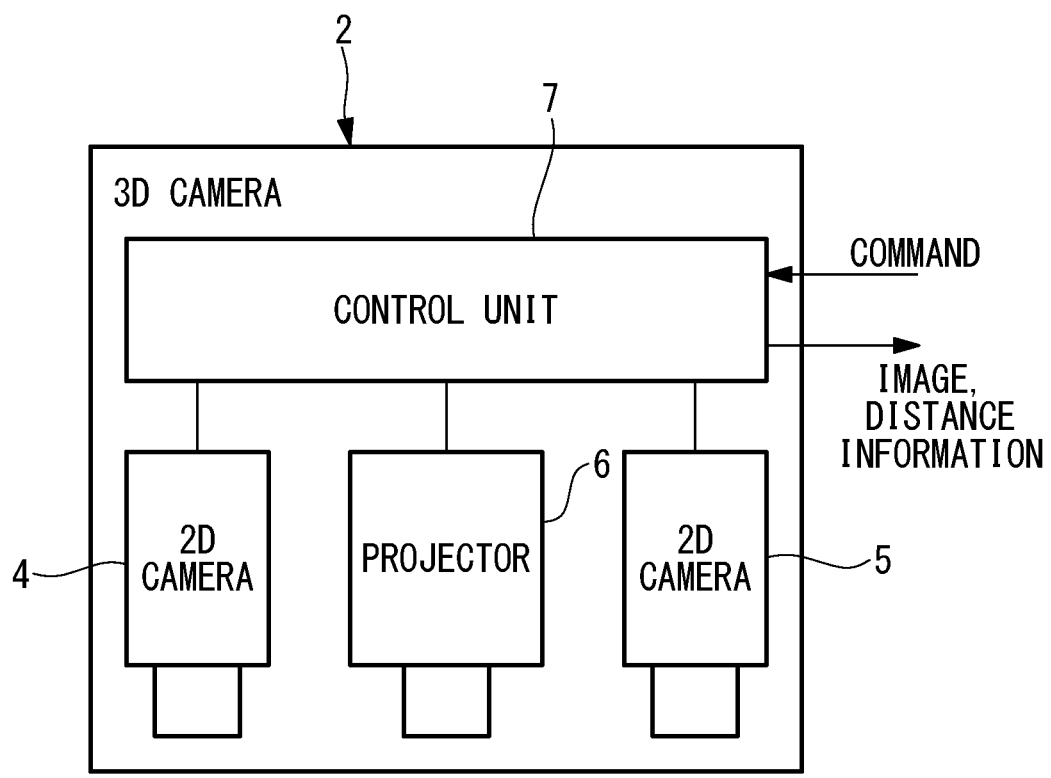
FIG. 2 is a block diagram illustrating a 3D camera of the 3D image-capturing device in FIG. 1.

As illustrated in FIG. 2, the 3D camera 2 includes, for example, two 2D cameras 4 and 5 that are disposed so as to be spaced apart from each other in a direction perpendicular to an optical axis A, a projector (illumination device) 6 that irradiates the object O with illumination light of a prescribed pattern, and a control unit (processor) 7. The 3D camera 2 is, for example, installed above the object O so as to face downwards using a pedestal, which is not illustrated. Alternatively, the 3D camera 2 may be mounted on the wrist 110 of the robot 100.

The 3D camera 2 acquires two 2D images by capturing images of the object O, which is illuminated with illumination light of a prescribed pattern by the projector 6, from different directions using the two 2D cameras 4 and 5. The control unit 7 is formed of a processor. The control unit 7 receives commands from a controller 3, makes the 2D cameras 4 and 5 and the projector 6 operate, and calculates distance information of the object O from the two 2D images acquired by the 2D cameras 4 and 5.

The method of calculating the distance information is, for example, performed by searching for small areas within the two 2D images where patterns match and obtaining a parallax from the difference between the positions of the found small areas in the images. The greater the distance from the 3D camera 2 to the object is, the smaller the parallax is, and the smaller the distance from the 3D camera 2 to the object is, the larger the parallax is. Utilizing this fact, distance information of the object O is calculated by converting the parallax at each position in the images into a distance.

Searching for small areas within the two 2D images where patterns match is performed, for example, by calculating matching scores using a sum of absolute difference (SAD) method and searching for the small areas that have the highest matching score (smallest sum of absolute difference in brightness between the pixels).

Figure 3:
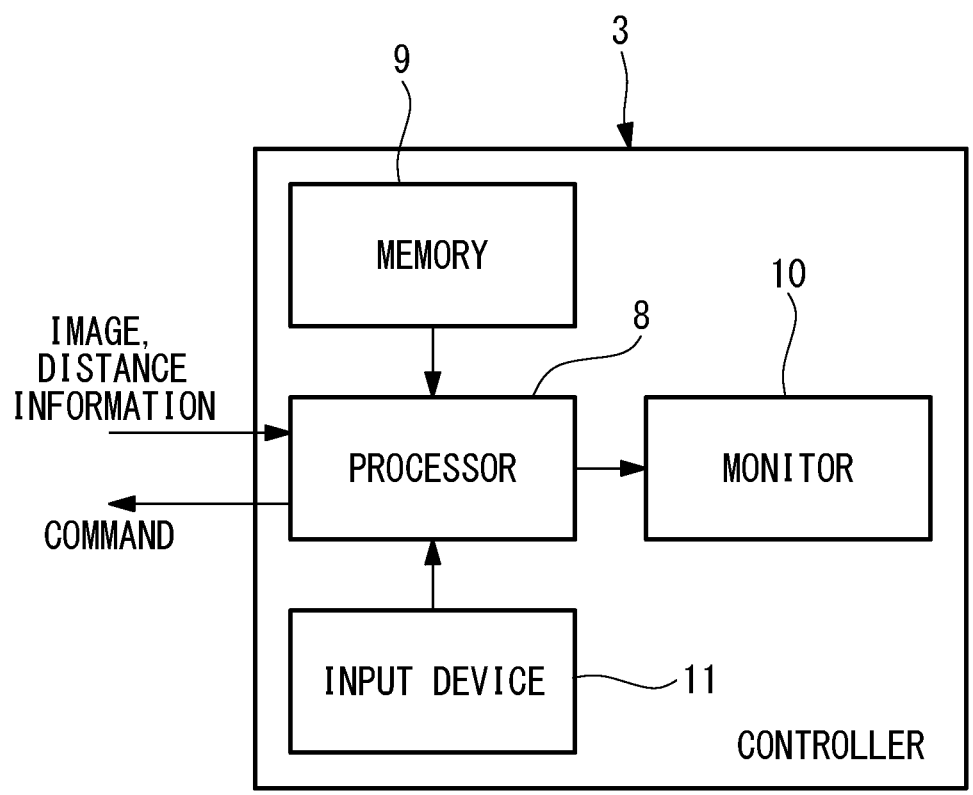
FIG. 3 is a block diagram for describing a controller of the 3D image-capturing device in FIG. 1.

As illustrated in FIG. 3, the controller 3 is a computer that includes at least one processor 8 including hardware, a memory 9, a monitor 10, and an input device 11 such as a keyboard or a mouse for facilitating input by the user.

Either one of a 2D image and distance information acquired by the 3D camera 2 is input to the controller 3.

The processor 8 causes the monitor 10 to display the input 2D image and allows a first area X for which distance information does not need to be acquired and a second area Y for which distance information is to be acquired to be specified in the displayed 2D image using the input device 11. Specifying of the first area X and the second area Y is, for example, performed by tracing out the area using a mouse or by moving a cursor on the screen using a keyboard.

One or more adjustable parameters and thresholds are stored in the memory 9 as image-capturing conditions used when acquiring distance information. The parameters may include, for example, the exposure times of the 2D cameras 4 and 5, the light intensity of the projector 6, a matching score calculated in pattern matching, and the size of a small area used in pattern matching.

The thresholds include a first threshold Th1 that represents the upper limit of an amount L1 of distance information acquired in the first area X and a second threshold Th2 that represents the lower limit of an amount L2 of distance information acquired in the second area Y. The second threshold Th2 is higher than the first threshold Th1.

The processor 8 switches the parameters of the image-capturing conditions stored in the memory 9 and sends commands to the 3D camera 2 in order to acquire distance information. Then, the processor 8 searches for image-capturing conditions for which the amount L1 of distance information acquired in the first area X is less than or equal to the first threshold Th1 and the amount L2 of distance information acquired in the second area Y is greater than the second threshold Th2.

An image-capturing condition adjusting method using the thus-configured 3D image-capturing device 1 according to this embodiment will be described hereinafter. The image-capturing condition adjusting method according to this embodiment will be described using a case where only the exposure time is adjusted as an example of an image-capturing condition parameter.

Figure 4:
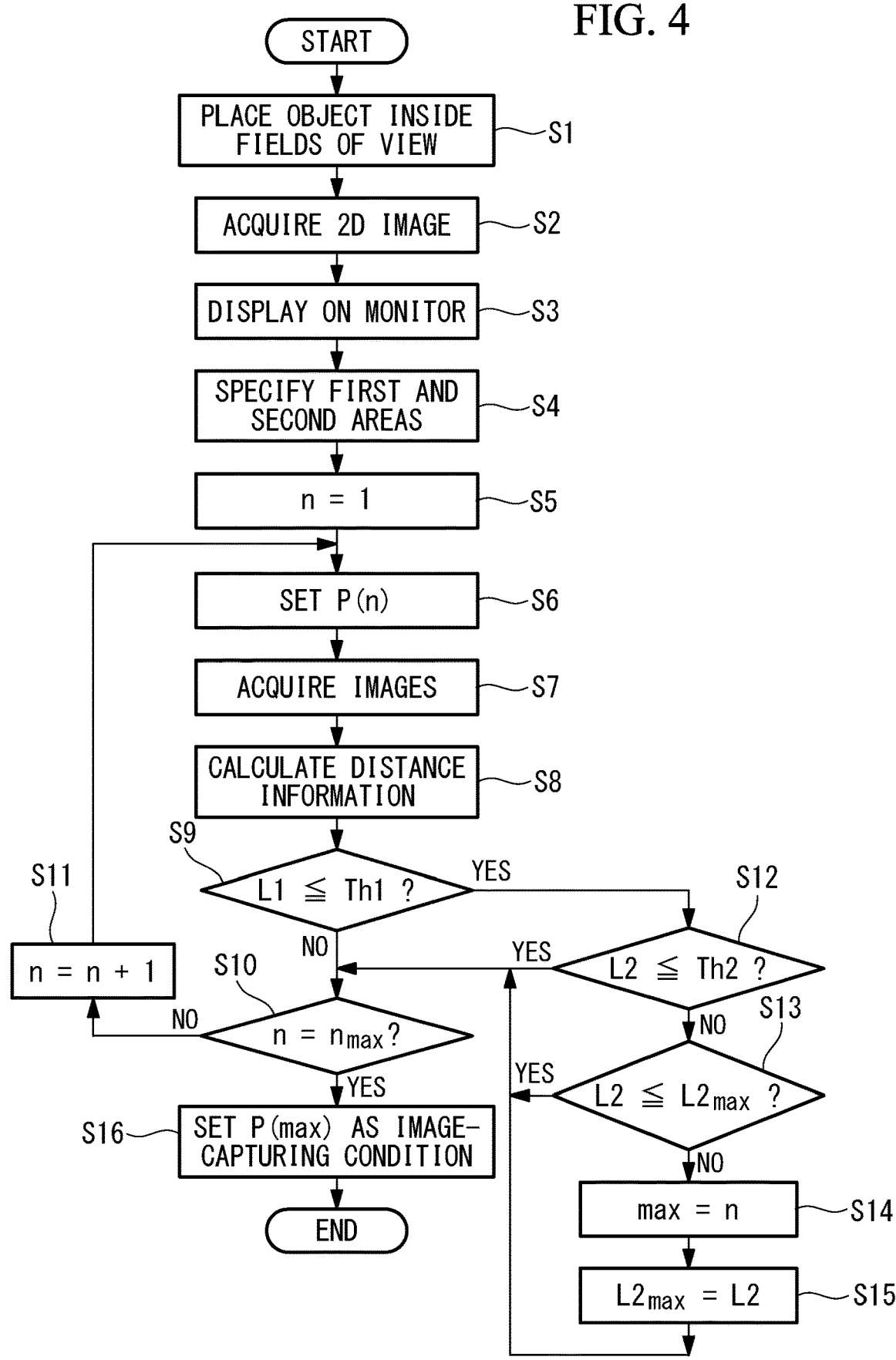
FIG. 4 is a flowchart illustrating an image-capturing condition adjusting method in which the 3D image-capturing device in FIG. 1 is used.

As illustrated in FIG. 4, first, the object O is placed within the fields of view of the two 2D images (step S1) and then a 2D image is acquired by either of the 2D cameras 4 and 5 without operating the projector 6 (step S2).

The acquired 2D image of the object O is displayed on the monitor 10 by the processor 8 (step S3) and the user is able to specify the first area X for which distance information is not required and the second area Y for which distance information is to be acquired.

In this state, the user specifies the first area X and the second area Y on the displayed 2D image (step S4).

Figure 5:
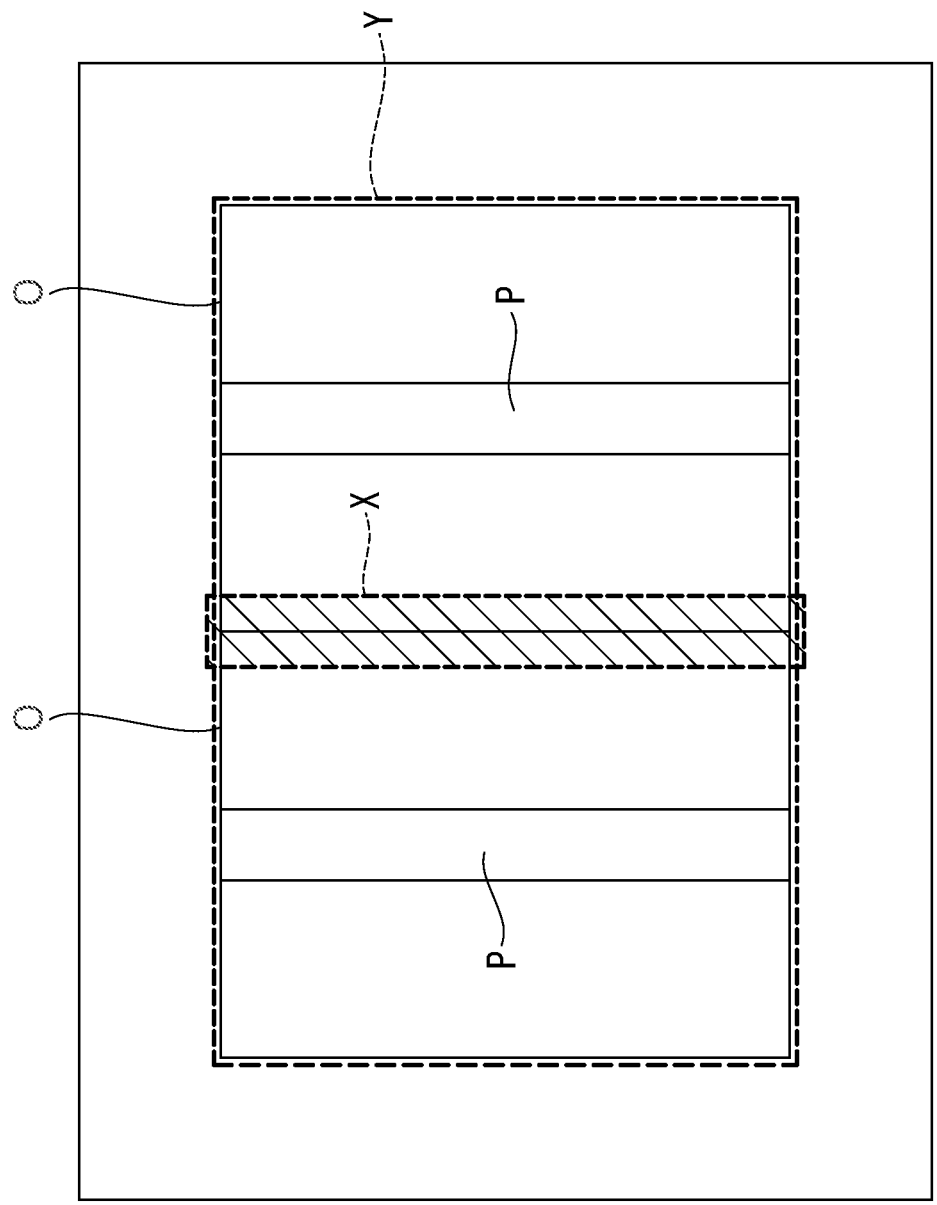
FIG. 5 is a diagram illustrating an example of specifying a first area and a second area of an image displayed on a monitor in the 3D image-capturing device in FIG. 1.

As illustrated in FIG. 5, in the case where objects O are two cardboard boxes having the same shape disposed next to each other, a boundary line between the two cardboard boxes that are the objects O is surrounded by a rectangle (indicated by hatching in the figure) in order to specify the inside of the rectangle as the first area X. Furthermore, for example, the entire area of the upper surfaces of the two cardboard boxes disposed adjacent to each other and that constitute the objects O is surrounded by a rectangle in order to specify the inside of the rectangle as the second area Y. In the figure, signs P indicate packing tape used to seal the cardboard boxes.

Once the first area X and the second area Y are specified, the processor 8 initializes a counter n (step S5) and sets a parameter P(n) of image-capturing conditions for acquiring distance information (step S6). The parameter P(n) is an exposure time that increases by a prescribed time interval Δt as n is increased by one starting from n=1. Then, the processor 8 adjusts the 3D camera 2 to the set image-capturing condition and causes the 3D camera 2 to acquire two 2D images having a parallax therebetween (step S7).

The two 2D images acquired by the two 2D cameras 4 and 5 are processed in an image-processing unit, which is not illustrated, of the 3D camera 2. Pattern matching is performed using small areas of a set size, the parallax between the two 2D images is calculated only at corresponding points where a set matching score is satisfied, and distance information is obtained on the basis of the calculated parallax (step S8).

The distance information obtained within the first area X and the second area Y is sent to the controller 3 where it is determined whether the amount L1 of distance information obtained within the first area X is less than or equal to the first threshold Th1 (step S9). In the case where the amount L1 of distance information is greater than the first threshold Th1, it is determined whether the counter n is a maximum value $n_{max}$ (step S10).

In the case where the counter n is not the maximum value $n_{max}$, the counter n is incremented (step S11) and the processing from step S6 is repeated. In the case where it is determined that the amount L1 of distance information obtained within the first area X is less than or equal to the first threshold Th1 in step S9, it is determined whether the amount L2 of distance information obtained within the second area Y is less than or equal to the second threshold Th2 (step S12). In the case where the amount L2 of distance information is less than or equal to the second threshold Th2, the processing advances to step S10.

In the case where the amount L2 of distance information is greater than the second threshold Th2 in step S12, it is determined whether the amount L2 of distance information is less than or equal to a maximum value $L2_{max}$ (step S13) and in the case where the amount L2 of distance information is less than or equal to the second threshold Th2, the processing advances to step S10. In the case where the amount L2 of distance information is greater than the maximum value $L2_{max}$, the counter n is saved as a counter max of the parameter P(n) at which the amount L2 of distance information is maximized (step S14). Then, the maximum value $L2_{max}$ is updated to the value of the amount L2 of distance information (step S15) and the processing returns to step S10.

In step S10, in the case where the counter n is the maximum value $n_{max}$, P(max) is set as an image-capturing condition (step S16) and the processing is terminated.

Thus, with the image-capturing condition adjusting method according to this embodiment, the parameter P(max) can be set as an image-capturing condition for which the amount L1 of distance information acquired in the first area X is less than or equal to the first threshold Th1 and the amount L2 of distance information acquired in the second area Y is maximum. In other words, in this embodiment, it is possible to set an image-capturing condition that allows the amount L1 of distance information acquired in the first area X to be reduced to less than or equal to the first threshold Th1 by setting, as the first area X, a boundary part between the two cardboard boxes that are the objects O. As a result, the boundary between the two cardboard boxes can be recognized as an area in which the objects O do not exist, thereby allowing the robot 100 to recognize each cardboard box as an individual separate object O.

Once the image-capturing condition has been set, the same distance information can be acquired so long as the same type of cardboard boxes are handled, and there is an advantage that two cardboard boxes disposed close to each other can be clearly distinguished from each other as separate objects O.

Note that although exposure time has been used as an image-capturing condition in this embodiment, the image-capturing condition does not have to be exposure time, and, for example, at least one other image-capturing condition, such as the illumination light intensity of the projector, the size of the score used for pattern recognition, or the size of the small area, may be used.

In the case where the first area X for which distance information is not required is darker than the other areas, it is possible to make it more difficult to obtain distance information from the first area X by setting the light intensity of the projector 6 to be lower. In the case where the first area X is brighter than the other areas, it is possible to make it more difficult to obtain distance information from the first area X by setting the light intensity of the projector 6 to be higher so as to cause halation.

It can be made more difficult to obtain distance information from the first area X by setting the score (evaluation criterion) used in pattern recognition so as to be more severe (to a smaller value) in order to make it more difficult to find corresponding positions in the first areas X of the two 2D images.

In addition, making the size of the small areas smaller makes it easier to find corresponding positions even in areas where there are large changes in shape or fine shapes, whereas making the size of the small areas larger makes it more difficult to find corresponding positions in areas where there are large changes in shape or fine shapes, and the number of erroneous correspondences in flat parts can be reduced.

Furthermore, a case in which the 3D camera 2 includes the control unit (processor) 7 that calculates distance information has been described as an example, but the 3D camera 2 may output two 2D images and distance information may be calculated by the processor 8 inside the controller 3.

In addition, the first area X for which distance information is not required and the second area Y for which distance information is required are specified in the 2D image displayed on the monitor 10, but alternatively only the first area X may be specified and the second area Y may be set as the entire remaining part of 2D image.

The invention claimed is:

1. A 3D image-capturing device, comprising:
   at least one camera that acquires a 2D image and distance information of an object;
   a monitor that displays the 2D image acquired by the camera; and
   at least one processor including hardware,
   wherein the processor acquires a first area for which the distance information is not required in the 2D image displayed on the monitor, and
      sets an image-capturing condition so that an amount of the distance information acquired by the camera in the acquired first area is less than or equal to a prescribed first threshold and an amount of the distance information acquired by the camera in a second area, which is at least part of an area other than the first area, and is greater than a prescribed second threshold that is larger than the first threshold,
   wherein there are two cameras provided, and the cameras are spaced apart in a direction that intersects an optical axis, and
   the processor calculates a parallax between parts of two 2D images by matching small areas in the two 2D images acquired by the two cameras, and calculates the distance information on the basis of the calculated parallax.

2. The 3D image-capturing device according to claim 1, wherein the processor acquires the second area for which the distance information is required in the 2D image displayed on the monitor.

3. The 3D image-capturing device according to claim 1, wherein the image-capturing condition includes an exposure time of the camera.

4. The 3D image-capturing device according to claim 1, further comprising:
   an illumination device that illuminates the object,
   wherein the image-capturing condition includes an illumination light intensity produced by the illumination device.

5. The 3D image-capturing device according to claim 1, wherein the image-capturing condition includes an evaluation criterion used for the matching.

6. The 3D image-capturing device according to claim 1, wherein the image-capturing condition includes a size of the small areas.

7. An image-capturing condition adjusting method, comprising:
   specifying a first area for which distance information is not required in a 2D image acquired by at least one camera that acquires a 2D image and distance information of an object,
   setting an image-capturing condition so that an amount of the distance information acquired in the specified first area is less than or equal to a prescribed first threshold and an amount of the distance information acquired in a second area, which is at least part of an area other than the first area, and is greater than a prescribed second threshold that is larger than the first threshold;
   calculating a parallax between parts of two of 2D images by matching small areas in the 2D images of the object acquired by two of cameras provided so as to be spaced apart in a direction that intersects an optical axis; and
   calculating the distance information on the basis of the calculated parallax.

8. The image-capturing condition adjusting method according to claim 7, further comprising:
   specifying the second area for which the distance information is required in the 2D image displayed on a monitor.

9. The image-capturing condition adjusting method according to claim 7, wherein the image-capturing condition includes an exposure time of the camera.

10. The image-capturing condition adjusting method according to claim 7,
    wherein the image-capturing condition includes an illumination intensity used to illuminate the object.

11. The image-capturing condition adjusting method according to claim 7, wherein the image-capturing condition includes an evaluation criterion used for the matching.

12. The image-capturing condition adjusting method according to claim 7, wherein the image-capturing condition includes a size of the small areas.

* * * * *